United States Patent Office 3,657,246
Patented Apr. 18, 1972

3,657,246
2-AMINO-7-SUBSTITUTED PYRIDO[2,3-d]
PYRIMIDINE COMPOUNDS
Robert F. Meyer, Ann Arbor, Mich., assignor to Parke,
Davis & Company, Detroit, Mich.
No Drawing. Filed July 22, 1969, Ser. No. 843,773
Int. Cl. C07d 51/46
U.S. Cl. 260—256.4 F    2 Claims

ABSTRACT OF THE DISCLOSURE 2-amino-7-substituted-(and optionally 6,7-disubstituted)-pyrido[2,3-d]pyrimidine compounds; and acid-addition salts. Substitution at position 6 includes methyl, methoxy, or phenoxy. Substitution at position 7 includes phenyl, substituted phenyl, thienyl, or pyridyl. 6,7-disubstitution can also include a fused ring. The compounds are pharmacological agents, especially diuretic agents producing increased urinary excretion of water and sodium. They can be produced by reacting 2,4-diamino-5-pyrimidinecarboxaldehyde with a ketone in the presence of a base.

SUMMARY AND DETAILED DESCRIPTION

The present invention relates to new polycyclic amine compounds. More particularly, the invention relates to new 2-amino-7-substituted-(and optionally 6,7-disubstituted)-pyrido[2,3-d]pyrimidine compounds, to salts thereof, and to methods for the production of the foregoing compounds.

In the forms of their free bases, the compounds of the invention can be represented by the formula

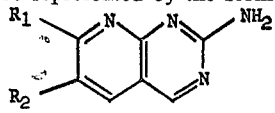

In this formula, $R_1$ alone represents thienyl, pyridyl, or a group of the formula

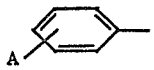

in which A represents hydrogen, halogen, amino, di-(lower alkyl)amino, or methoxy. $R_2$ alone represents hydrogen, methyl, methoxy, or phenoxy. In addition, $R_1$ and $R_2$ can be combined and in combination represent a group of the formula

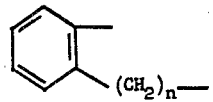

in which $n$ is 1 or 2. When $R_1$ and $R_2$ are combined, the compounds have tetracyclic fused ring systems. The lower alkyl groups preferably contain not more than 4 carbon atoms each. Methyl and ethyl are preferred lower alkyl groups.

In accordance with the invention, the compounds of the foregoing formula and their salts can be produced by reacting 2,4-diamino-5-pyrimidinecarboxaldehyde of the formula

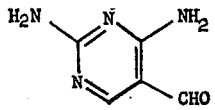

with a ketone of the formula

in the presence of a base, followed by isolating the product directly as the free base or, following treatment with an acid, as an acid-addition salt; where $R_1$ and $R_2$ are as defined before. Some examples of suitable bases that can be used in carrying out the reaction are alkali metal alkoxides, alkali metal amides, and alkali metal hydrides. A preferred base is sodium methoxide. Some examples of suitable solvents are alkanols, alkoxyalkanols, glycols, diethylene glycol diethyl ether, nitrobenzene, dimethyl sulfoxide, and tertiary amides. A preferred solvent is 2-ethoxyethanol. The 2,4-diamino-5-pyrimidinecarboxaldehyde and the ketone can be used in approximately equimolar quantities, although a 10–20% excess of the ketone is preferred. The base can be used in a catalytic amount. If the 2,4-diamino-5-pyrimidinecarboxaldehyde is added to the reaction mixture in the form of an acid-addition salt, sufficient additional base for neutralization is used. The time and temperature of the reaction are not particularly critical. In general, a temperature between about 80 and 150° C. or the reflux temperature of the solvent, and a reaction time from one hour or less to 6 hours, are satisfactory. At the reflux temperature of 2-ethoxyethanol, the reaction is substantially complete within one hour. The product is isolated directly from the basic reaction mixture as the free base or, following treatment with an acid, as an acid-addition salt.

The free bases of the invention form acid-addition salts with any of a variety of inorganic and organic acids. Pharmaceutically-acceptable acid-addition salts are formed with such acids as hydrochloric, hydrobromic, sulfuric, nitric, phosphoric, acetic, citric, tartaric, succinic, benzoic, salicyclic, maleic, lactic, gluconic, ascorbic, and pamoic acids. The free bases and their salt forms are interconvertible by adjustment of the pH. They differ in solubility properties but in general are otherwise equivalent for the purposes of the invention.

The compounds of the invention are useful as pharmacological agents and especially as diuretic agents producing increased urinary excretion of water and sodium. The compounds of the invention are active upon oral administration but can also be given by the parenteral route if desired. Their activity as diuretic agents can be measured by standard diuretic assays. For example, a compound of the invention is administered orally (by gavage) with saline to rats that have been subjected to an 18-hour fast from food and water. The urine volume, sodium excretion, and potassium excretion are measured during the 5-hour period following drug administration and compared with corresponding control values in rats that received saline alone without a test compound. In this assay procedure, the following results were obtained for 2-amino-7-phenylpyrido[2,3-d]pyrimidine, a representative compound of the invention, administered at doses of 2 mg./kg. and 20 mg./kg.: urine volume, 35.4 and 35.2 ml./kg. (control value 11.4 ml./kg.); sodium excretion, 3.9 and 4.5 milliequivalents/kg. (control value 1.4 milliequivalents/kg.); potassium excretion, 0.8 and 0.8 milliequivalents/kg. (control value 0.4 milliequivalents/kg.).

The invention is illustrated by the following examples.

EXAMPLE 1

A mixture of 8.7 g. of 2,4-diamino-5-pyrimidine-carboxaldehyde hydrochloride, 4.0 g. of sodium methoxide, 7.2 g. of acetophenone, and 100 ml. of 2-ethoxyethanol is heated at reflux for one hour and cooled in an ice bath. The insoluble product is collected on a filter and washed with water. It is 2-amino-7-phenylpyrido[2,3-d]pyrimidine; M.P. 241–243° C. following crystallization from methanol. A hydrochloride salt is obtained by dissolving the free base in ethanol and adding hydrogen chloride. A salt with sulfuric acid is obtained by dissolving the free base and sulfuric acid in 50% aqueous ethanol. A salt with lactic acid is obtained by dissolving the free base and lactic acid in 50% aqueous ethanol. A salt with citric acid is obtained by adding a solution of citric acid in methanol to a solution of the free base in methanol.

EXAMPLE 2

By the procedure of the foregoing example, with the substitution of the indicated amount of another ketone for the acetophenone, the following additional compounds are obtained.

From 8.0 g. of propiophenone, the product is 2-amino-6 - methyl - 7 - phenylpyrido[2,3-d]pyrimidine; M.P. 265–270° C. following crystallization from ethanol.

From 9.0 g. of 2-methoxyacetophenone, the product is 2 - amino - 6 - methoxy - 7 - phenylpyrido[2,3-d]pyrimidine; M.P. 238–240° C. following crystallization from ethanol.

From 12.7 g. of 2-phenoxyacetophenone, the product is 2 - amino - 6 - phenoxy - 7 - phenylpyrido[2,3-d]pyrimidine; M.P. 278–282° C. following crystallization from ethanol.

From 9.0 g. of o-methoxyacetophenone, the product is 2 - amino - 7 - (o-methoxyphenyl)pyrido[2,3-d]pyrimidine; M.P. 208–210° C. following crystallization from ethanol.

From 9.0 g. of m-methoxyacetophenone, the product is 2 - amino-7-(m-methoxyphenyl)pyrido[2,3-d]pyrimidine; M.P. 230–233° C. following crystallization from ethanol.

From 9.0 g. of p-methoxyacetophenone, the product is 2 - amino - 7 - (p-methoxyphenyl)pyrido[2,3-d]pyrimidine; M.P. 269–271° C. following crystallization from ethanol.

From 9.3 g. of o-chloroacetophenone, the product is 2 - amino - 7 - (o-chlorophenyl)pyrido[2,3-d]pyrimidine; M.P. 250–253° C. following crystallization from ethanol.

From 8.0 g. of o-aminoacetophenone, the product is 2 - amino - 7-(o-aminophenyl)pyrido[2,3-d]pyrimidine; M.P. 255–260° C. following crystallization from ethanol.

From 8.0 g. of m-aminoacetophenone, the product is 2 - amino - 7 - (m-aminophenyl)pyrido[2,3-d]pyrimidine; M.P. 274–276° C. following crystallization from ethanol.

From 8.0 g. of p-aminoacetophenone, the product is 2 - amino - 7 - (p-aminophenyl)pyrido[2,3-d]pyrimidine; M.P. 328–332° C. following crystallization from ethanol.

From 6.6 g. of 2-thienyl methyl ketone, the product is 2 - amino - 7 - (2 - thienyl)pyrido[2,3-d]pyrimidine; M.P. 275–280° C. following crystallization from ethanol.

From 7.3 g. of 3 - acetylpyridine, the product is 2-amino - 7 - (3 - pyridyl)pyrido[2,3-d]pyrimidine; M.P. 248–252° C. following crystallization from ethanol.

From 7.3 g. of 4 - acetylpyridine, the product is 2-amino - 7 - (4 - pyridyl)pyrido[2,3-d]pyrimidine; M.P. 326–328° C. following crystallization from methanol.

From 7.9 g. of 1-indanone, the product is 2-amino-6H-indeno[2',1':5,6]pyrido[2,3-d]pyrimidine; M.P. 317–320° C. following crystallization from ethanol.

From 8.8 g. of 1-oxo-1,2,3,4-tetrahydronaphthalene, the product is 10 - amino - 5,6-dihydrobenzo[h]pyrimido-[4,5-b]quinoline; M.P. 296–298° C. following crystallization from ethanol.

Each of the above free bases is converted to a hydrochloride salt, a salt with sulfuric acid, a salt with lactic acid, or a salt with citric acid by reaction with the corresponding acid.

EXAMPLE 3

A mixture of 5.2 g. of 2,4 - diamino - 5 - pyrimidinecarboxaldehyde hydrochloride, 2.2 g. of sodium methoxide, 5.5 g. of o-dimethylaminoacetophenone, and 75 ml. of 2-ethoxyethanol is heated at reflux for one hour, cooled to room temperature, and filtered. The filtrate is concentrated in vacuo and the residue washed with water and with ether. This product is 2-amino-7-[o-(dimethylamino) phenyl]pyrido[2,3-d]pyrimidine; M.P. 208–211° C. following crystallization from acetonitrile.

I claim:
1. 2 - amino-6-methoxy-7-phenylpyrido[2,3-d]pyrimidine.
2. 2 - amino-7-(o-aminophenyl)pyrido[2,3-d]pyrimidine.

References Cited
UNITED STATES PATENTS 2,749,344    6/1956    Hitchings et al. _____ 260—256.4

ALEX MAZEL, Primary Examiner

R. V. RUSH, Assistant Examiner

U.S. Cl. X.R.

260—256.5; 424—251